United States Patent

Chmielecki, Jr. et al.

[11] Patent Number: 5,740,467
[45] Date of Patent: Apr. 14, 1998

[54] APPARATUS AND METHOD FOR CONTROLLING INTERRUPTS TO A HOST DURING DATA TRANSFER BETWEEN THE HOST AND AN ADAPTER

[75] Inventors: Stanley Chmielecki, Jr., Nashua, N.H.; Frank A. Itkowsky, Jr., Leominster, Mass.; G. Paul Koning, Brookline, N.H.; Douglas M. Washbaugh, Leominster, Mass.; Kadangode K. Ramakrishnan, Maynard, Mass.

[73] Assignee: Digital Equipment Corporation, Maynard, Mass.

[21] Appl. No.: 310,899

[22] Filed: Sep. 21, 1994

Related U.S. Application Data

[63] Continuation of Ser. No. 818,564, Jan. 9, 1992, abandoned.

[51] Int. Cl.⁶ .................................................. G06F 13/00
[52] U.S. Cl. .......................... 395/876; 395/310; 395/733; 395/200.2
[58] Field of Search ......................... 395/200.07, 842, 395/843, 872, 876, 877, 882, 200.2, 309, 310, 733

[56] References Cited

U.S. PATENT DOCUMENTS

| | | | |
|---|---|---|---|
| 4,535,420 | 8/1985 | Fung | 395/250 |
| 4,635,191 | 1/1987 | Boning | 395/325 |
| 4,675,865 | 6/1987 | DeVries et al. | 370/85.1 |
| 4,754,399 | 6/1988 | Yamamoto et al. | 395/250 |
| 5,043,981 | 8/1991 | Firoozmand et al. | 370/85.1 |
| 5,163,132 | 11/1992 | DuLac et al. | 395/275 |
| 5,347,634 | 9/1994 | Herrell et al. | 395/843 |
| 5,488,724 | 1/1996 | Firoozmand | 395/200.07 |

FOREIGN PATENT DOCUMENTS

| | | | |
|---|---|---|---|
| 0267974 | 5/1988 | European Pat. Off. | G06F 13/12 |
| 0425764 | 5/1991 | European Pat. Off. | G06F 5/06 |

OTHER PUBLICATIONS

Harold Stone, "Microcomputer Interfacing"; Addison-Wesley, Reading USA, p. 18, Paragraph 2, p. 19, Paragraph 2.

*Primary Examiner*—Jack B. Harvey
*Assistant Examiner*—Glenn A. Auve
*Attorney, Agent, or Firm*—Kenneth F. Kozik

[57] ABSTRACT

An apparatus and method for transferring data in a data processing system to and from a host system. A communication adapter or input/output controller device is provided in which queues are utilized to transfer information between the adapter or controller and the host system. In order to minimize the amount of time a system or I/O bus or network is used during transfer of data between the adapter or controller and the host system, and reduce the amount of work that must be performed by the host system, the number of interrupts by the adapter or controller of the host system is limited to the minimum amount necessary by using an interrupt arm mechanism and by keeping track of completion indices stored in the host system.

25 Claims, 4 Drawing Sheets

APPARATUS AND METHOD FOR CONTROLLING INTERRUPTS TO A HOST DURING DATA TRANSFER BETWEEN THE HOST AND AN ADAPTER

This application is a continuation of application Ser. No. 07/818,564, filed Jan. 9, 1992, now abandoned.

FIELD OF THE INVENTION

The invention relates to a communication adapter or input/out controller device for transferring data between a host system and a network or peripheral device.

BACKGROUND OF THE INVENTION

In a data processing system, communication adapters and I/O controllers are provided to transfer data between a host system and a network or peripheral device. The memory and processor of the host system are coupled to the adapter or controller by a system or I/O bus or by a network.

As the central processing units in host systems have become faster, the difference between the speed of processor operations involving local registers or cache memory, and the speed of accesses between the processor of the host system and main memory or peripheral devices, has been magnified. As a result, in order for data processing systems to better utilize the faster processors, there is a need to provide more efficient methods of transferring data between the host system and networks or peripheral devices.

In order to improve performance, most high performance adapters and controllers make use of direct memory access (DMA) to transfer data. However, the use of DMA itself does not guarantee high performance. A high performance adapter or controller should minimize the amount of time a system or I/O bus is used during transfer of data between the adapter or controller and the host system, should reduce the amount of work that must be performed by the host system, and also should provide an efficient implementation of DMA.

One model for DMA transfers between host memory and I/O controllers is described by H. Michael Wenzel for the IEEE P1212 CSR Architecture Specification in "CSR Architecture (DMA Framework): Recommended DMA Architectures," Part III-A, Draft 1.38 (Jul. 5, 1990), which is herein incorporated by reference.

In this model, which may be used for transfers involving such system buses as Futurebus+, SCSI, and SerialBus, circular queues are provided for communicating information between the adapter or controller and the processor in the host system. A circular queue is a software array structure of message storage locations. The items in circular queues are accessed in first-in, first-out order, and a particular circular queue will be used to pass messages in only one direction, from a single producer of the queue item to a specific consumer of the queue item.

Each circular queue is associated with two separate indices, i.e., a producer index and a consumer index. The producer index points to a selected item in the circular queue that has been or will be written ("produced"). The consumer index points to a selected item in the circular queue that has been or will be read ("consumed"). As items are added to and subsequently removed from the queue, the consumer index will continually chase the producer index around the circular array of items.

A circular queue may be used as a bus interface between a host memory in a host system and a communication adapter or I/O controller. Preferably, the entire circular queue is located in physically contiguous storage locations in the host memory. The communication adapter or I/O controller is provided with a set of control fields in its memory. The control fields describe the location of the circular queues in host memory, and the value of the producer index and/or the consumer index.

There are several equivalent ways in which to implement a circular queue. For example, the particular queue items pointed to by the producer and consumer indices may be defined in different ways. Typically, the producer index will either point to the next queue item that will be written or to the last queue item that was written. Similarly, the consumer index generally is defined as pointing to either the next queue item that will be read or to the last queue item that was read.

By comparing the producer and consumer indices for a particular circular queue, a device can determine whether the circular queue is empty (requiring the writing of more items into the queue before any additional queue items can be read) or full (requiring the reading of more items from the queue before any additional queue items can be written).

In order to easily distinguish between a queue that is full and a queue that is empty, it is preferable if at least one location in the circular queue is always left empty. In this way, a new item will never be written into the circular queue at a location that immediately follows a location in which the next item to be read is stored. As a result, whenever the next item to be read is the same as the next item to be written, the queue is empty. In contrast, whenever the next item to be written immediately follows the next item to be read, the queue is full.

There are several reasons why it is advantageous to use indices to access the circular queue instead of address pointers that specifically identify where a particular queue item is stored in host memory. Indices are easy to update atomically, and they are convenient for keeping parallel copies of internal state information related to each queue item. Furthermore, an index is more compact than an address pointer and can normally consist of a single byte. Regardless of the range and size of the address values that correspond to the storage locations of the items in a queue, the indices for the queue will have only one size.

There are relatively simple algorithms for writing items into the circular queue and reading items out of the circular queue. For example, if the queue contains a total of "N" items (N is a positive integer), and the producer index points to the next location in the circular queue to which an item will be written, then a new queue item is written ("filled") in the location in the queue pointed to by the producer index, and the producer index is incremented (modulo N) to point to the next location in the queue. If the consumer index points to the last location in the circular queue from which an item was read, then the next queue item that is removed from the queue is read ("emptied") from the location in the queue that immediately follows (modulo N) the location pointed to by the consumer index, and the consumer index is incremented (modulo N) to point to that location in the queue.

Some of the advantages of using circular queues are the synchronization mechanisms they provide for memory access. The producer of the queue items is only allowed to update the producer index as it fills (writes an item into) the queue. Similarly, the consumer of the queue items is only allowed to update the consumer index as it empties (reads an item out of) the queue. Therefore, there is no confusion as to which queue items are available (i.e., empty locations are available to the producer and full locations are available to the consumer), and which queue items can be read from or written to by each device.

Several concerns involving caching arise at times when a communication adapter or I/O controller is not cache-coherent with the host system, or when the communication adapter or I/O controller is prohibited from participating in the cache coherence protocol of the host system. In these configurations, the software must keep track of accesses to host memory by the processor in the host system and by the communication adapter or I/O controller, respectively.

Typically, when a processor in the host system accesses information stored in host memory, the processor accesses a cached copy. When a communication adapter or I/O controller accesses information from the same locations in host memory, the adapter or controller directly accesses the host memory locations, instead of accessing a copy of the information stored in the host processor's cache. As a result, precautions must be taken to prevent misreading of the information or overwriting of the information by mistake.

Misreading of information can occur if the host processor accesses information stored in its cache when more up-to-date values of that same information are present in host memory. Therefore, at times when the host processor accesses that information, the software will have to ensure that the values returned to the processor are the up-to-date values residing in host memory rather than the values previously stored in its cache. As a result, a number of cycles must be allocated by the processor to ensure that current information is contained in jets cache. Furthermore, overwriting of information written into host memory by the communication adapter or I/O controller can occur at times when the host processor "flushes" (writes) the information stored in its cache back into host memory.

These types of logic hazards in accessing the items pointed to by the producer and consumer indices can be minimized when a circular queue is used and there is a single writer and a single reader of items in the queue. For example, if the processor in the host system is the only producer of items in the queue and the communication adapter or I/O controller is the only consumer of items in the queue, then only the processor will write items into the queue, and only the communication adapter or I/O controller will read items out of the queue. Furthermore, neither the host processor nor the communication adapter or I/O controller can access a particular item in the queue unless that item is exclusively "owned" by it. Thus, "full" locations that contain items that have been written by the producer are available only to the consumer, and those locations are subsequently available to the producer only after the items in those locations are read ("emptied") by the consumer.

In implementations in which multiple writers can access queue items, a semaphore system, ownership bits, or some equivalent mechanism is provided to signal which of the multiple writers has permission to access the queue item. However, in these multiple writer implementations, the need to check and update semaphores or ownership bits degrades performance of the data processing system.

In data processing systems in which there is a single writer and a single reader, no semaphores or ownership bits need be exchanged between the host processor that is the producer of the queue items and the communication adapter or I/O controller that is the consumer of the queue items. If the circular queue is properly used, there is no danger that one device will overwrite values that lave been written by the producer before those values are read by the consumer.

However, in these single writer and single reader data processing systems, a potential problem due to caching can occur at times when the host processor (producer) changes the value of a circular queue item stored in its cache. If the host processor then increments its producer index prior to flushing (writing) its cache back into host memory, the queue location corresponding to the changed queue item is considered to be full by the adapter or controller, even though the new queue item has not yet been written into host memory. As a result, the communication adapter or I/O controller may read the queue item (or data structures linked to the queue item) before the cache line is flushed, and may access old information that is being replaced by the host processor. The "cache line" is the width of a cache (typically sixteen to sixty-four bytes) that is brought in by the host processor when it reads data from host memory. If the host processor changes any entry in its cache, the host processor subsequently replaces the corresponding entry in host memory by flushing the entire cache line back into host memory.

This potential problem of the adapter or controller reading an invalid queue item (or data structure linked to the queue item) from host memory, after the corresponding queue item has been replaced by a newly produced entry in the cache of the host processor, can be avoided. At times when a new queue item is written (produced) by the host processor, the host processor (producer) should increment the producer index only after flushing its cache line containing the newly produced entry back into host memory. In this way, the communication adapter or I/O controller will not read old entries out of host memory, and only the values of queue items in host memory that were previously written by the host processor and read by the adapter or controller are replaced as a result of a cache flush into host memory.

Another feature of the circular queue model is the ability to obtain access to and transfer items in blocks. For example, if the consumer is a communication adapter or I/O controller that falls far behind a processor that functions as the producer, a comparison of the producer and consumer indices will indicate how many queue items to transfer to the communication adapter or I/O controller in a single block. Simply by reading the producer and consumer indices and comparing them, the producer determines how many empty locations are currently available in the queue for writing, and the consumer determines show many full locations have not yet been read.

In a circular queue, the items may be used to represent messages which are sent on a system or I/O bus or network. The queue items themselves may contain data and commands, or may instead contain pointers to buffers located in the host memory. In addition to data, queue items (or the buffers pointed to by queue items) may contain information representing transaction initiation, transaction completion, commands from the host system to the communication adapter or I/O controller, or asynchronous status indications from the communication adapter or I/O controller to the host system.

Communication between a processor in the host system and a communication adapter or I/O controller is mostly asymmetrical with respect to the production and consumption of buffers. The host processor initiates most transactions, provides the related buffer space in host memory, and generally functions as a master over the communication adapter or I/O controller. A transaction generally proceeds in the manner described below.

First, the host processor sets aside a number of buffers in host memory for the transfer of data to and/or from the communication adapter or I/O controller. Second, the host processor sends a transaction initiation message to the communication adapter or I/O controller. This can be implemented by writing the message in a command queue in host memory. (in another approach, the message can be written directly into a control and status register of the communication adapter or I/O controller.) Third, if the transaction initiation message is sent via command queue, the host processor triggers the communication adapter or I/O controller to service the command queue.

Fourth, if the transaction initiation message is sent via command queue, the transaction initiation message is then read by the communication adapter or I/O controller from its command queue, and message-related events are scheduled for processing by the communication adapter or I/O controller. Fifth, during event processing by the communication adapter or I/O controller, the communication adapter or I/O controller block copies data to or from the host memory.

Sixth, the communication adapter or I/O controller sends a transaction completion message to the host processor by writing the message in a command response queue for the host processor. Seventh, the communication adapter or I/O controller triggers the host processor to service its command response queue. Eighth, the transaction completion message is read by the host processor from its command response queue. Ninth, the host processor frees the buffers in host memory that were previously set aside, and delivers any data and status received from the communication adapter or I/O controller to an applications program.

After a new queue item is written by the host processor that is the producer of the queue items, the communication adapter or I/O controller that is the consumer of the queue items reads the new queue item. The communication adapter or I/O controller then updates its consumer index and writes the updated consumer index into host memory. After the communication adapter or I/O controller has completed operations on the new queue item and has written its updated consumer index into host memory, the communication adapter or I/O controller sends an interrupt to the processor of the host system.

In data processing systems that include a relatively high speed host system and host processor, the cost of interrupt processing is severe, especially when a large number of short messages are being transferred between the host system and the adapter or controller. This may be the case in implementations in which a communication adapter is used to provide an interface between the host system and a network, such as a token ring network.

Performance of these data processing systems can be improved by reducing the number of interrupts, thereby reducing the number of times that the operations of the high speed host processor must be suspended in order to service an interrupt. One way to reduce the number of interrupts is for the host system to process longer bursts of data in response to an interrupt, and for the adapter or controller to avoid sending unnecessary interrupts.

In these data processing systems, it often is convenient to transfer data between the host system and the adapter or controller in relatively long bursts. For example, a node in a token ring network must wait for a token before the node can transfer data packets on the network. As a result, there is a tendency for multiple data packets (packet trains) to be transferred on the network in a single burst.

Under these circumstances, one way in which an adapter or controller can avoid sending unnecessary interrupts is by sending only a single interrupt when multiple data packets can be transferred between the host system and the adapter or controller in a single burst. When the host system is requested to service the interrupt, it is desirable for the host system to process an entire packet train rather than a single data packet.

Unfortunately, the adapter or controller cannot decide whether an additional interrupt of the host system is necessary (e.g., in response to the receipt by the adapter or controller of an additional data packet) unless the adapter or controller obtains or receives information indicating how much work has been done by the host system. Accordingly, it is desirable to provide a data processing system in which the adapter or controller can determine whether queue items (or data structures linked to the queue items) that have been processed by the adapter or controller were subsequently processed by the host system.

Therefore, in order to minimize the amount of time a system or I/O bus or network is used during transfer of data between the adapter or controller and the host system, and to reduce the amount of work that must be performed by the host system, it is desirable to limit the number of interrupts sent by the adapter or controller to the host system to a minimum amount necessary.

SUMMARY OF THE INVENTION

It is an object of the invention to overcome at least some of the problems associated with the prior art.

It is therefore desirable to provide an improved communication adapter or input/output controller device for transferring data between a host system and a network or peripheral device. It would be beneficial to provide an apparatus and method in which queues are utilized to transfer information between the communication adapter or input/output controller and the host system.

Preferably, the communication adapter or input/output controller should be able to read (consume) queue items from host memory, and write and read data to and from data buffers in host memory, without unnecessarily interrupting the processor in the host system. However, the communication adapter or input/output controller must not be implemented in a way that may prevent the sending of an interrupt to the host system at times when an interrupt is required.

Additional objects and advantages of the invention will be set forth in part in the description which follows, and in part will be obvious from the description, or may be learned by practice of the invention. The objects and advantages of the invention may be realized and obtained by means of the instrumentalities and combinations particularly pointed out in the appended claims.

To achieve the objects and in accordance with the purposes of the invention, as embodied and broadly described herein, an apparatus and method is provided for transferring data in a data processing system. The data processing system includes a host system having a host memory and a host processor, and a device coupled to the host system and having a packet memory. Data is transferred to and/or from a number of buffers in the host memory. A number of descriptors is stored in the host memory in a queue to indicate where available buffers are stored in host memory. A producer index stored in host memory points to a selected descriptor in the queue.

The functions that are performed by the device include: storing data in the packet memory; storing a consumer index that points to a selected descriptor in the queue; receiving a producer index from the host system; comparing the producer index with the consumer index, to determine whether any buffers are available in the host memory for transfers of data between the packet memory and the host memory; reading, from the queue in the host memory, a descriptor that indicates where the next available buffer is stored in host memory; transferring data between the packet memory and the next available buffer in host memory, at times when buffers are available in the host memory for transfers of data between the packet memory and the host memory; updating the consumer index, in response to the transferring of data between the packet memory and the host memory, to point to another selected descriptor in the queue; setting an interrupt arm bit to enable the device to interrupt the host system; and interrupting the host system, after the transferring of data between the packet memory and the host memory, at times when the interrupt arm bit is set.

In another embodiment of the invention, the data processing system includes a completion index stored in the host memory that points to a selected descriptor in the queue. In this embodiment, the functions performed by the device include: receiving a completion index from the host system; comparing the completion index with the updated consumer index, to determine whether the host processor has completed processing in response to a transfer of data between the packet memory and the host memory; and interrupting the host system, after the transferring of data between the packet memory and the host memory, at times when the host processor has not completed processing in response to the transfer of data between the packet memory and the host memory.

The accompanying drawings, which are incorporated in and constitute a part of this specification, illustrate preferred embodiments of the invention and, together with the description of the invention, explain the principles of the invention.

DESCRIPTION OF THE PREFERRED EMBODIMENT

Reference will now be made in detail to a presently preferred embodiment of the invention, an example of which is illustrated in the accompanying drawings.

Figure 1:
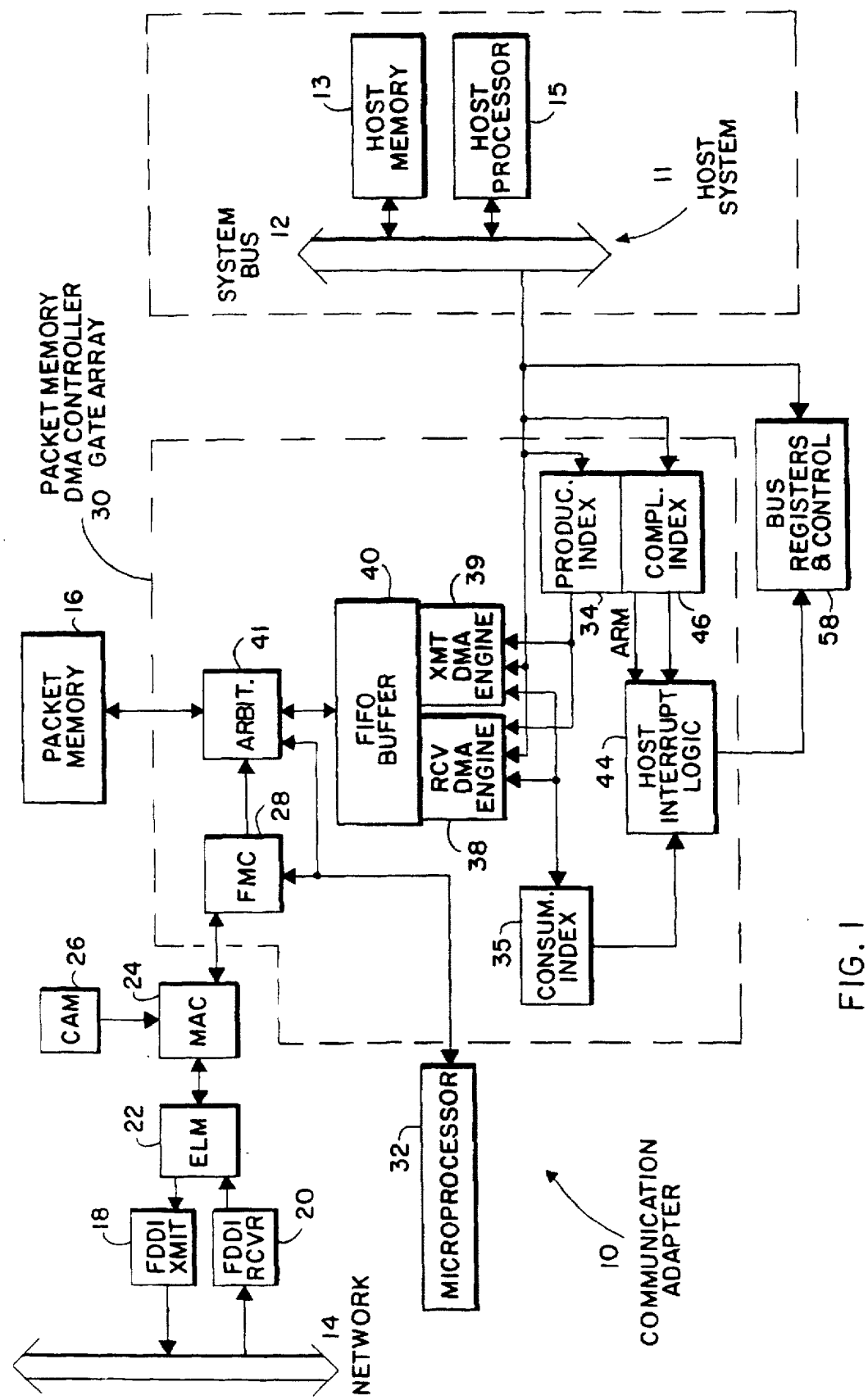
FIG. 1 is a block diagram of a preferred embodiment of a device for practicing the present invention.

A preferred embodiment of a device for transferring data in a data processing system is shown in FIG. 1. As embodied herein, the device is a communication adapter, which is represented generally by the numeral 10. The data processing system includes a system bus 12 that may be directly coupled to the device, or an I/O bus or network (not shown) instead of the system bus may be directly coupled to the device. Preferably, system bus 12 transfers data in accordance with the bus specifications for Futurebus+. A host system 11 includes a host memory 13 and a host processor 15 that are coupled to system bus 12.

The data processing system also may include a network 14 coupled to the device. Various types of wide and local area networks may be coupled to communication adapter 10, including any packet data network. Examples include a token ring network or an Ethernet network.

A network of particular applicability is the fiber distributed data interface (FDDI), which is an American National Standard for a 100 megabit per second token ring using an optical fiber medium. The characteristics of FDDI networks are described in detail by Floyd E. Ross in "FDDI—A Tutorial," IEEE Communications Magazine, vol. 24, no. 5, pp. 10–17 (May 1986), which is herein incorporated by reference.

Information is transmitted on an FDDI ring network in frames using a four of five group code, with each five-bit code group being called a symbol. Each byte corresponds to two symbols or ten bits. The nature of the clocking limits data frames to a maximum length of 4,500 bytes (i.e., 9,000 symbols or 45,000 bits).

In accordance with the invention, a packet memory 16 is provided for storing data. Preferably, storage is set aside for a circular queue in which the queue items are transmit data descriptors, storage is set aside for a circular queue in which the queue items are receive data descriptors, storage is set aside for transmit data buffers for storing transmit data, and storage is set aside for receive data buffers for storing receive data.

A preferred embodiment of communication adapter 10 includes means for transferring data between the packet memory and the network. As embodied herein, communication with an FDDI network is provided by FDDI optics and connectors in FDDI transmitter 18 and FDDI receiver 20, by elasticity buffer and physical link management (ELM) 22, and by a media access control gate array (MAC) 24. A content addressable memory (CAM) 26 operates in conjunction with MAC 24, and stores valid network addresses.

A frame memory controller 28 interfaces to MAC 24. Frame memory controller 28 is included in a packet memory DMA controller gate array 30. Frame memory controller 28 will place a packet of receive data from network 14 into a receive data queue in packet memory 16. Similarly, a packet of transmit data in a transmit data queue in packet memory 16 will be transmitted by frame memory controller 28 to MAC 24.

At times when frame memory controller 28 places a packet of receive data into a receive data queue in packet memory 16, a packet memory receive data descriptor identifying a packet memory receive data buffer is stored in the packet memory by the frame memory controller. In a preferred implementation, the packet memory receive data descriptor is received from MAC 24 by the frame memory controller, and includes a field indicating the starting address of the corresponding receive data buffer in packet memory. The packet memory receive data descriptor also may have a field specifying the number of receive data buffers corresponding to the packet, although as embodied herein, a single packet memory receive data buffer is provided for storage of each packet of receive data. The packet memory receive data descriptor also includes other fields indicating the length in bytes of the corresponding receive data buffer in packet memory, or the length in bytes of the packet of receive data (at times when a single packet memory receive data buffer is provided for storage of a packet of receive data). Other fields may provide frame status bits, a frame status count, and a receive completion code indicating whether the frame was successfully received and providing additional information about reception of the packet.

At times when frame memory controller 28 transmits a packet of transmit data from packet memory 16 to MAC 24, a packet memory transmit data descriptor identifying a packet memory transmit data buffer is utilized by the frame memory controller. In a preferred implementation, the packet memory transmit data descriptor is provided by the packet memory 16 and includes fields indicating to frame memory controller 28 the starting address of the corresponding transmit data buffer in packet memory, and the length of the packet of transmit data in bytes.

Adapter 10 is designed to prevent overruns and underflows during reception and transmission of packets of data. As described previously, data frames received from an FDDI network have a maximum length of 4,500 bytes. The amount of storage set aside in packet memory 16 for packet memory receive data descriptors and packet memory receive data buffers is considerably larger than the largest possible packet that can be received by adapter 10. Before MAC 24 accepts a packet of receive data from network 14, a sufficient amount of space is available in an empty receive data buffer in packet memory 16 to store a maximum size packet, and the location of the required space in packet memory 16 is identified using a packet memory receive data descriptor. Additionally, before sending a packet of transmit data from the frame memory controller to MAC 24, a complete pac must be available in transmit data buffers in packet memory 16, and the full packet memory transmit data buffers are identified by packet memory transmit data descriptors.

Communication adapter 10 can eliminate much of the control and status information that typically is transferred between a communication adapter or I/O controller and the host system. For example, in a preferred embodiment, when a packet of transmit data received from the host system is transmitted to network 14 from adapter 10, the adapter does not write status information concerning transmission of the packet of transmit data back to the host system. The adapter is designed to prevent the occurrence of overruns and underflows, and other types of errors in transmission of a packet of transmit data from host system 11 to network 14 will be rare.

Typically, when a communication adapter transfers a receive data packet to a host system, the receive data packet is transferred during an initial transaction, and a receive packet descriptor describing certain aspects of the receive data packet is subsequently sent by the adapter to the host system during a separate transaction.

It is advantageous to reduce the number of transactions required in order to transfer a particular receive data packet from adapter 10 to host system 11. Generally, in order to perform an I/O operation using a separate transaction, adapter 10 first must request access to system bus 12 (which may require arbitration by adapter 10, followed by a latency period) before adapter 10 is granted access to system bus 12. During the actual transaction, in addition to sending data on system bus 12, adapter 10 also will have to provide address and control information to host system 11.

In a preferred embodiment of the invention, adapter 10 does not make use of an I/O operation during a separate transaction in order to provide a receive packet descriptor to host system 11, and does not provide a receive packet descriptor to the host system after previously transferring the corresponding receive data packet to the host system. When a packet of receive data is transferred from network 14 to packet memory 16, information contained in fields in the packet memory receive data descriptor (e.g., the length in bytes of the packet of receive data, frame status bits, a frame status count, and a receive completion code indicating whether the frame was successfully received and providing additional information about reception of the packet) is received from MAC 24. This packet length and status information is forwarded by adapter 10 to host system 11, during the same transaction that is used to transfer the receive data packet, in a packet descriptor at the beginning of each packet of receive data that is transferred to host system 11.

In order to provide accurate packet length and status information to host system 11, adapter 10 does not have to generate and forward an additional receive packet descriptor after an entire receive data packet is received from network 14 and transferred to host system 11. As discussed previously, adapter 10 is designed to prevent the occurrence of overruns and underflows. Since these types of errors will not occur, accurate packet length and status information is contained in the fields in the packet memory receive data descriptor, and this information is available when adapter 10 begins to transfer the receive data packet from packet memory 16 to host system 11.

These features of adapter 10 assist in minimizing the amount of time the system bus is used during transfer of data between the adapter and the host system, and reduce the amount of work that must be performed by the host system during normal operation. While host system 11 may be required to perform programmed I/O operations in several separate transactions during initialization of adapter 10 or in response to errors, these events are infrequent enough to have minimal effect on the performance of host system 11 and system bus 12.

In accordance with the invention, data is transferred between the packet memory and buffers in the host memory, preferably via DMA. Adapter 10 includes a microprocessor 32. However, transmit data stored in host memory 13 is written in a transmit data queue in packet memory 16 and transmitted by frame memory controller 28 to MAC 24, all without any intervention by microprocessor 32. Similarly, a packet of receive data is placed in a receive data queue in packet memory 16 by frame memory controller 28 and written in host memory 13 without intervention by the microprocessor.

In a preferred embodiment of the data processing system, circular queues of the type discussed previously and described by H. Michael Wenzel for the IEEE P1212 CSR Architecture Specification in "CSR Architecture (DMA Framework): Recommended DMA Architectures," Part III-A, Draft 1.38 (Jul. 5, 1990) are provided for DMA transfers between host memory 13 and adapter 10.

In accordance with the invention, host memory 13 contains a number of receive buffers and transmit buffers. These buffers need not be of fixed size or at any particular location in host memory. Host system 11 is the producer and allocates empty buffers for receive data and full buffers for transmit data.

In the host memory of the present invention, receive descriptors are stored in a receive queue to indicate where empty receive buffers are stored in host memory. Transmit descriptors are stored in the host memory in a transmit queue to indicate where full transmit buffers are stored in host memory.

Preferably, a number of locations are provided in host memory 13 for storage of a receive descriptor queue that contains 256 entries, and additional locations are provided in host memory 13 for storage of a transmit descriptor queue that also contains 256 entries. In a preferred implementation, each receive data descriptor set up by host system 11 corresponds to a receive data buffer, and includes fields indicating whether the corresponding buffer is the first buffer allocated for a packet, indicating the starting address of the corresponding receive data buffer in host memory, indicating the length of the corresponding receive data buffer, and indicating the total number of receive data buffers being supplied for receiving a single packet. Each transmit data descriptor set up by the host system corresponds to a transmit data buffer, and includes fields indicating whether the corresponding buffer is the first buffer allocated for a packet, indicating the starting address of the corresponding transmit data buffer in host memory, indicating the length of the corresponding transmit data buffer in bytes, and indicating whether the corresponding buffer is the last buffer allocated for a packet.

Typically, more than one transmit buffer is provided in order to transfer data packets from host memory 13 to packet memory 16. One or more transmit buffers are used to store user data that is supplied when host processor 15 executes an applications program. Additionally, a separate transmit buffer is provided in order to store header data that corresponds to the user data. As a result, a chain of transmit buffers is formed in order to transfer the packet of transmit data.

More than one receive buffer also may be provided in order to transfer data packets to host memory 13 from packet memory 16. In particular, it may be desirable to store receive data from packet memory 16 in locations in host memory 13 that are not contiguous in physical address space. As a result, a number of receive buffers that correspond to noncontiguous physical addresses may be chained together in order to transfer the packet of receive data.

In accordance with the invention, a receive producer index stored in host memory 13 points to a selected receive descriptor in the receive queue. A transmit producer index stored in host memory 13 points to a selected transmit descriptor in the transmit queue. Preferably, the receive producer index identifies one of the corresponding 256 data descriptors that have been set up in the receive queue, and the transmit producer index identifies one of the corresponding 256 data descriptors that have been set up in the transmit queue. Each of these indices is updated by the host system to point to the next location in the corresponding queue in which a descriptor will be written by the host system.

The device of the present invention includes receive producer index means for receiving a receive producer index from the host system; transmit producer index means for receiving a transmit producer index from the host system; receive consumer index means for storing a receive consumer index that points to a selected receive descriptor in the receive queue; and transmit consumer index means for storing a transmit consumer index that points to a selected transmit descriptor in the transmit queue. As embodided herein, the receive producer index means, transmit producer index means, receive consumer index means, and transmit consumer index means are provided by registers in the packet memory DMA controller gate array, i.e., producer index registers 34 and consumer index registers 35. Host system 11 writes the receive and transmit producer indices into producer index registers 34 after the updating of these indices by the host system.

The consumer indices stored in consumer index registers 35 point to selected descriptors in the queues set up in host memory 13. Preferably, each consumer index identifies one of 256 data descriptors in the corresponding queue. In a preferred embodiment of the invention, the consumer indices point to the last descriptors that were read from the corresponding circular queue in host :memory 13 by adapter 10.

Figure 2:
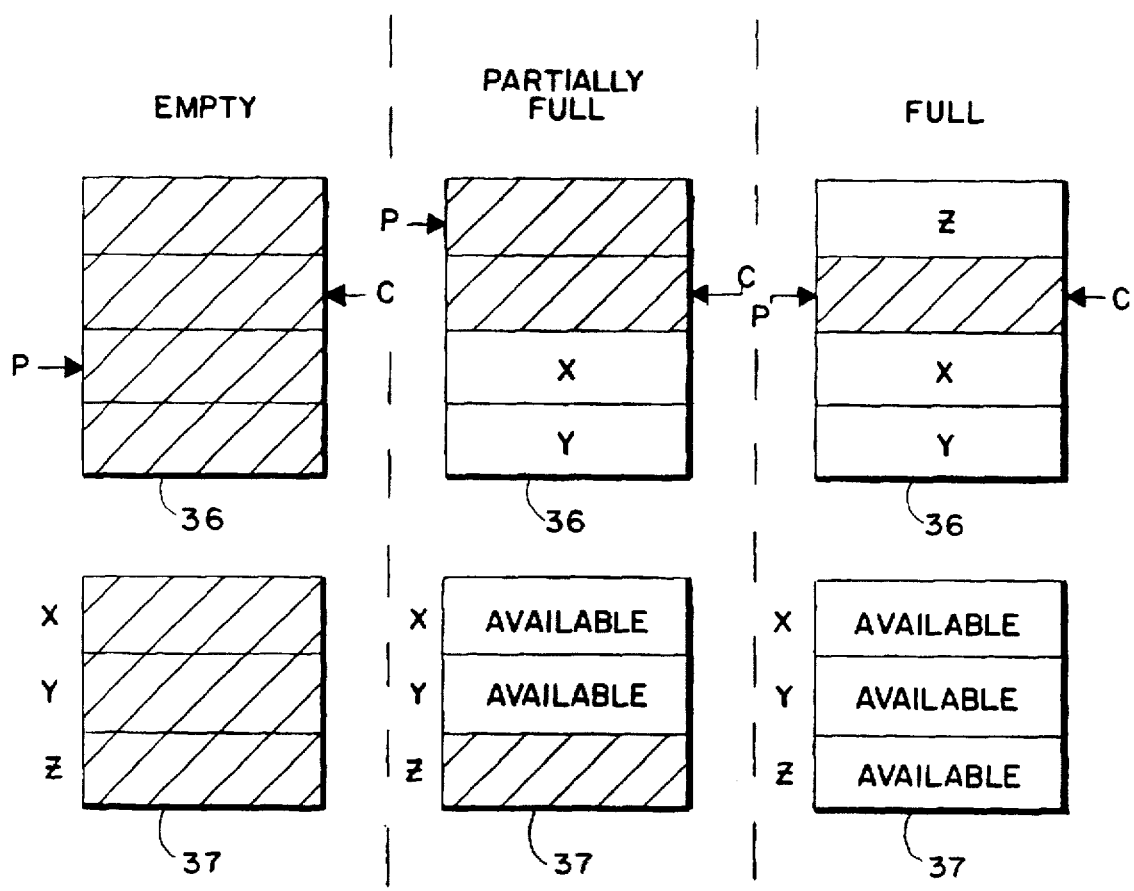
FIG. 2 is a diagram of data structures in a host memory for implementing a circular queue of data descriptors.

A simple example of the data structures in host memory 13 for implementing circular queues of data descriptors is shown in FIG. 2. A transmit descriptor queue 36 (having only four entries) is stored in a descriptor block in host memory 13. A set of transmit data buffers 37 corresponding to transmit descriptor queue 36 is stored in a data block in host memory 13. Although only transmit descriptor queue 36 and transmit data buffers 37 are shown in FIG. 2, similar data structures are provided in host memory 13 for storage of a receive descriptor queue and a set of receive data buffers corresponding to the receive descriptor queue.

As embodied in FIG. 2, a transmit producer index P points to the next location in transmit descriptor queue 36 in which a transmit descriptor will be written by the host system. Transmit producer index P is stored in host memory 13. A transmit consumer index C points to the last location in transmit descriptor queue 36 from which a transmit descriptor was read by the adapter.

As shown in FIG. 2, one position is always left empty (hatched in FIG. 2) in transmit descriptor queue 36. When a transmit descriptor is written into transmit descriptor queue 36, transmit producer index P is incremented (using modulo arithmetic). When a transmit descriptor is read from transmit descriptor queue 36, transmit consumer index C is incremented. The transmit descriptor queue is empty when transmit consumer index C points to a location that is exactly one position behind transmit producer index P in the circular queue. Transmit descriptor queue 36 is full when transmit consumer index C and transmit producer index P point to the same location in the circular queue.

As embodied in FIG. 2, whenever the descriptor queue is not empty, there are descriptors that can be accessed by adapter 10 in order to transfer data between corresponding data buffers that are available in host memory 13 and packet memory 16. Each transmit descriptor in queue 36 that can be accessed by adapter 10 includes data identifying the starting address of a corresponding transmit data buffer in host memory 13. For example, when transmit descriptor queue 36 is full, transmit data buffers 37 are available (unhatched in FIG. 2) for reading by adapter 10 at starting addresses x, y, and z of host memory 13.

In accordance with the invention, means is provided in the device for comparing the receive producer index with the receive consumer index, to determine whether any empty receive buffers are available in the host memory for transfers of data from the packet memory to the host memory. The device also includes means for comparing the transmit producer index with the transmit consumer index, to determine whether any full transmit buffers are available in the host memory for transfers of data to the packet memory from the host memory.

Adapter 10 includes a receive DMA engine 38 and a transmit DMA engine 39 in packet memory DMA controller gate array 30. DMA transfer of receive data cannot be commenced by receive DMA engine 38 at times when the receive queue in host memory 13 is full. Therefore, as embodied herein, DMA transfer of receive data can occur at times when the receive consumer index stored in consumer index registers 35 does not point to the receive data descriptor immediately preceding the receive data descriptor in the queue that is pointed to by the receive producer index stored in producer index registers 34. DMA transfer of transmit data cannot be commenced by transmit DMA engine 39 at times when the transmit queue is empty. Therefore, as embodied herein, DMA transfer of transmit data can occur at times when the transmit producer index stored in producer index registers 34 and the transmit consumer index stored in consumer index registers 35 do not point to the same transmit data descriptor in the transmit queue in host memory 13.

The device of the present invention includes means for reading a receive descriptor from the receive queue in the host memory that indicates where the next available empty receive buffer is stored in host memory 13, and means for reading a transmit descriptor from the transmit queue in the host memory that indicates where the next available full transmit buffer is stored in host memory 13. Preferably, receive descriptors corresponding to empty receive buffers and transmit descriptors corresponding to full transmit buffers are read from their respective circular queues in first-in, first-out order.

In accordance with the invention, means is provided for reading receive data from the packet memory and writing the receive data into the next available empty receive buffer in host memory, at times when empty receive buffers are available in the host memory for transfers of data from the packet memory to the host memory. Furthermore, means is also included for reading transmit data from the next available full transmit buffer in the host memory and writing the transmit data into the packet memory, at times when full transmit buffers are available in the host memory for transfers of data to the packet memory from the host memory. Preferably these transfers of receive and transmit data to and from host memory 13 are performed via DMA.

As embodied herein, the receive and transmit DMA engines have a FIFO buffer 40, which provides storage for a number of longwords of data (one longword equals four bytes).

During transfers of receive data, first host system 11 writes an updated receive producer index into producer index registers 34, thereby making available empty receive data buffers in host memory 13 to accept a complete packet of receive data from network 14. In response, receive DMA engine 38 reads in a receive data descriptor from host memory 13, selecting from the receive queue in host memory 13 the receive descriptor (corresponding to an empty receive data buffer) that is identified using the updated receive producer index. Simultaneously, engine 38 reads a packet memory receive data descriptor previously provided by the frame memory controller for a receive data packet that now is to be transferred to host memory 13 via DMA.

The packet memory receive data descriptor utilized by receive DMA engine 38, which has been discussed previously, preferably includes fields identifying the starting address of the corresponding receive data buffer in packet memory, the length in bytes of the packet of receive data, frame status bits, a frame status count, and a receive completion code indicating whether the frame was successfully received and providing additional information about reception of the packet. The receive descriptor in host memory 13 identifies the starting address in host memory of an empty receive data buffer.

Using these two descriptors, the receive DMA engine transfers longwords from packet memory 16 into FIFO buffer 40. As soon as a certain number of longwords are stored in the FIFO buffer, receive DMA engine 38 transfers these longwords from the FIFO buffer into the empty receive data buffer in host memory. Transfers continue in this manner until the amount of data transferred corresponds to the number of bytes in the packet, which is calculated using the information provided in the packet memory receive data descriptor.

As discussed previously, certain information contained in fields in the packet memory receive data descriptor, such as the length of the packet of receive data and a receive completion code indicating whether frames were successfully received and providing additional information about reception of the packet, can be forwarded to host system 11 in a packet descriptor at the beginning of the packet of receive data. As a result, there is no need for adapter 10 to provide additional status information to the host system, and the adapter does not have to generate and forward an additional packet descriptor to the host system after the entire packet is transferred into host memory 13.

During transfers of transmit data, first the host system writes an updated transmit producer index into producer index registers 34, thereby making available full transmit data buffers in host memory 13 to present a complete packet of transmit data to be sent to network 14. In response, transmit DMA engine 39 reads in a transmit descriptor from host memory 13, selecting from the transmit queue in host memory 13 the transmit descriptor (corresponding to a full transmit data buffer) that is identified using the updated transmit producer index.

The transmit descriptor utilized by transmit DMA engine 39 includes fields indicating the starting address of a full transmit data buffer in host memory, indicating the length of the corresponding transmit data buffer in bytes, and indicating whether the corresponding buffer is the last buffer allocated for the packet to be transmitted. Using these fields, the transmit DMA engine transfers longwords from the full transmit data buffer in host memory 13 into FIFO buffer 40. As soon as a certain number of longwords are stored in the FIFO buffer, transmit DMA engine 39 transfers these longwords from the FIFO buffer into packet memory 16. Transfers continue in this manner until all of the bytes in the last buffer allocated for a transmit data packet have been moved into packet memory 16.

The only I/O operation discussed above that is performed by host system 11 during a separate transaction is the transfer of updated producer indices to producer index registers 34. In this way, adapter 10 receives information indicating how many buffers have newly been made available by host system 11 for the writing of receive data or the reading of transmit data by the adapter.

Preferably, the number of transactions and I/O operations that are required is reduced by writing updated producer indices in adapter 10 only after host system 11 produces a number of additional buffers. For example, host system 11 can wait until a number of full transmit buffers are available in host memory 13 in order to transfer a single burst containing multiple transmit delta packets into packet memory 16. Similarly, host system 11 can wait until enough empty receive buffers are available in host memory 13 for storage of a full receive data packet. If a sufficient number of empty receive data buffers already are available to adapter 10, it may be possible for the host system to even wait until a number of additional empty receive buffers are available in host memory 13 for receipt from adapter 10 of a single burst containing multiple receive data packets, or until enough empty receive buffers are available in host memory 13 for storage of a maximum size receive data packet. In a preferred embodiment of the data processing system, updated producer indices should be sent to and/or received by adapter 10 only as enough as is necessary to maintain a fairly steady flow of data between host system 11 and adapter 10.

In accordance with the invention, means is provided for updating the receive consumer index, in response to the writing of receive data into the next available empty receive buffer in host memory, to point to another selected receive descriptor in the receive queue. The device also includes means for updating the transmit consumer index, in response to the reading of transmit data from the next available full transmit buffer in host memory, to point to another selected transmit descriptor in the transmit queue.

Furthermore, the present invention may include means for transferring the updated receive consumer index to the host system after the transferring of data between the packet memory and the host memory, and means for transferring the updated transmit consumer index to the host system after the transferring of data between the packet memory and the host memory.

Preferably, the number of transactions and I/O operations that are required in the data processing system is reduced by having adapter 10 write an updated transmit consumer index in host memory 13 only after adapter 10 empties all of the transmit buffers that have been previously made available by host system 11.

With respect to receive data, adapter 10 should not wait until it has filled all of the receive buffers that have been previously been made available by host system 11 before writing an updated receive consumer index in host memory 13. Generally, it is preferable for adapter 10 to promptly notify host system 11 of the receipt of receive data even if empty receive buffers are still available in host memory 13.

Preferably, adapter 10 recognizes cases in which a number of full transmit buffers, or receive data for a number of empty receive buffers, is available for data transfers between the adapter and host memory 13. In those cases, the adapter can defer updating of the consumer indices while the data for a number of those multiple buffers is transferred. In this way, the number of transactions can even be reduced in circumstances involving receipt by the adapter of a burst including a number of receive data packets.

In a preferred embodiment of the invention, receive DMA engine 38 and transmit DMA engine 39 respectively determine whether all of the receive and transmit data in a packet has been transferred. As soon as the correct amount of data has been transferred, the appropriate consumer index is updated by writing into consumer index registers 35 an index value corresponding to the receive or transmit descriptor of the last data buffer in host memory 13 that was written into or read by adapter 10. In addition, a DMA transfer is performed by DMA engines 38 and 39 to write the new consumer index values in host memory 13.

Adapter 10 updates the consumer indices only after completing any corresponding transfers of data between host memory 13 and packet memory 16. Generally, host processor 15 updates the producer indices only after completing transfers of data between data buffers in host memory 13 and host processor 15, and after allocating descriptors to these newly available data buffers in host memory 13. After updating the producer indices, host system 11 performs a single CSR (control and status register) write transaction in order to transfer the updated producer indices to producer index registers 34 in adapter 10.

In order to prevent misreading or overwriting of information in a preferred embodiment of the invention, there is a single writer and a single reader for all indices and queue items, and also for receive and transmit data. Adapter 10 is the single writer of updated consumer indices in consumer index registers 35 in adapter 10 and in host memory 13, and also is the single writer of receive data in the receive data buffers in host memory 13. Host processor 15 is the single writer of updated producer indices in producer index registers 34 in adapter 10 and in host memory 13, the single writer of receive and transmit descriptors in the receive and transmit queues in host memory 13, and the single writer of transmit data in the transmit data buffers in host memory 13.

As embodied herein, host memory 13 is organized in a way that optimizes performance. Both the updated receive and transmit consumer indices are written by adapter 10 to the same longword in host memory 13. As a result, both of these indices will be on the same cache line of host processor 15, allowing both indices to be brought into the cache memory of host processor 15 with only a single read of host memory 13. Furthermore, the consumer and producer indices are stored in different sections of host memory 13 in order to ensure that the consumer and producer indices are on the same cache line. As a result of this separation of the consumer and producer indices, "thrashing" in the cache memory of host processor 15 is avoided. If the consumer and producer indices are all on the same cache line, writing of an updated consumer index in host memory 13 by adapter 10 invalidates producer indices stored in cache memory, even though those producer indices can only be written by host processor 15, and causes host processor 15 to perform an unnecessary additional read of host memory 13 in order to bring the same producer indices into cache memory again.

A packet memory arbitrator 41 is included in the packet memory DMA controller gate array. Packet memory arbitrator 41 allows only one component, i.e., a refresh timer (not shown) that is used to request a refresh cycle, frame memory controller 28, microprocessor 32, receive DMA engine 38 or transmit DMA engine 39, access to packet memory 16 at any one time.

In accordance with an embodiment of the invention, the device includes means for setting an interrupt arm bit to enable the device to interrupt the host system, and means for interrupting the host system, after the transferring of data between the packet memory and the host memory, at times when the interrupt arm bit is set. Preferably, additional means is provided for clearing the interrupt arm bit, in response to the interrupting of the host system, to prevent additional interrupts of the host system. In a preferred embodiment, the device so contains means for receiving a rearm request from the host system, and means for setting the interrupt arm bit in response to the receiving of a rearm request from the host system.

Generally, it is necessary for adapter 10 to interrupt the host system whenever a packet of receive data has been copied into the host memory or a packet of transmit data has been copied from the host memory. An interrupt is issued in order to notify the host system to process new receive data from packet memory 16 and provide additional empty buffers for receive data, or to notify the host system that buffers that were filled with transmit data can be reused because the transmit data has been stored in packet memory 16. The interrupt is issued after the updated consumer indices are transferred from adapter 10 to host memory 13.

An important feature of the invention is the elimination of unnecessary interrupts of the host system by adapter 10, which have a significant negative impact on performance of the host system and system bus 12. In particular, if the host system already is servicing an interrupt due to the transfer of a data packet, it is undesirable to issue another interrupt for the transfer of an additional data packet. As indicated previously, when host system 11 is requested to service an interrupt, it is desirable to provide a system in which the host system processes an entire packet train, instead of a system in which a separate interrupt is issued for each data packet in a burst.

To avoid issuing unnecessary interrupts, an interrupt arm bit is utilized in adapter 10. In a preferred embodiment, whenever the adapter completes the transfer of one or more packets of receive or transmit data and interrupts the host system, the interrupt arm bit is cleared. Adapter 10 is prevented from issuing an additional interrupt of the host system until the interrupt arm bit is set again ("rearmed"). Preferably, the interrupt arm bit is set in response to the receiving of a rearm request from the host system, which occurs after host processor 15 completes servicing of an interrupt issued by adapter 10. In this way, the host system itself can control how many interrupts it receives and ensures that it will not, receive unnecessary interrupts.

Unfortunately, a simplistic implementation of an interrupt arm bit mechanism may suppress the issuance by adapter 10 of necessary interrupts. In particular, there is uncertainty during the time period after the host system determines that servicing of an adapter interrupt has been completed, but before the interrupt arm bit is set in response to the receipt by adapter 10 of a rearm request from the host system. During this time period, adapter 10 may complete a transfer between packet memory 16 and host memory 13 of an additional packet of data.

Therefore, to prevent necessary interrupts from being suppressed, it is preferable for the adapter to be provided with status information that can be used to determine whether the host system has performed all of its necessary processing in response to the copying of data by adapter 10 to and/or from the host memory.

In accordance with an embodiment of the invention, a receive completion index may be stored in the host memory that points to a selected descriptor in the receive queue, and a transmit completion index may be stored in the host memory that points to a selected descriptor in the transmit queue. The device of the present invention may then include receive completion index means for receiving the receive completion index from the host system; transmit completion index means for receiving the transmit completion index from the host system; means for comparing the receive completion index with the updated receive consumer index, to determine whether any full receive buffers are available in the host memory for reading of receive data by the host processor from the host memory; means for comparing the transmit completion index with the updated transmit consumer index, to determine whether the host processor has completed processing in response to a transfer of transmit data to the packet memory from the host memory; and means for interrupting the host system, after the transferring of data between the packet memory and the host memory, at times when full receive buffers are available in the host memory for transfers of receive data by the host processor from the host memory, and at times when the host processor has not completed processing in response the transfer of data to the packet memory from the host memory.

In host system 11, host processor 15 executes driver software stored in host memory 13. Typically, driver software is a computer program that has a standardized interface to the operating system of the host system and that has a special adapter to operate a specific I/O device. The driver software instructs host processor 15 to read out receive data that is stored in full receive data buffers in host memory 13 and provide the receive data to an applications program. Similarly, in response to the reading of transmit data from the transmit data buffers by adapter 10, the driver software may instruct host processor 15 to deliver status information to an applications program, and also may instruct the host processor to write additional transmit data provided by an applications program into the empty transmit data buffers in host memory 13.

In the host system, receive and transmit completion indices are stored in host memory 13 and respectively correspond to the receive and transmit queues in the host memory. Preferably, the receive completion index points to a selected item in the receive queue that corresponds to the last receive data buffer in host memory 13 from which data was read by host processor 15. The transmit completion index points to a selected item in the transmit queue that corresponds to a particular transmit data buffer in host memory 13. Preferably, the transmit completion index points to the descriptor in the transmit descriptor queue that corresponds to the last transmit data buffer from which transmit data has been read by adapter 10 and which host processor 15 determines (as a result of the transmission of an updated transmit consumer index from the adapter to host system 11) has been processed by adapter 10. After host processor 15 recognizes that transmit data in a transmit data buffer has been read and processed by adapter 10, new transmit data may be written into the buffer by host processor 15, or the buffer may be placed in a pool of free data buffers.

As embodied herein, host processor 15 updates the receive completion index after reading data from a receive data buffer that was previously filled by adapter 10. In a preferred embodiment, host processor 15 updates the transmit completion index after completing processing in response to a transfer of transmit data to the packet memory from the host memory. For example, host processor 15 may update the transmit completion index after delivering status information to an applications program, or after writing data into a transmit data buffer that was previously emptied by adapter 10.

A comparison of the receive consumer index with the receive completion index, and a comparison of the transmit consumer index with the transmit completion index, indicates whether host processor 15 has work ("completion processing") to perform. At times when the receive completion and receive consumer indices do not match, there are full receive data buffers in host memory 13 that have not yet been read by the host processor. At times when the transmit completion and transmit consumer indices do not match, host processor 15 has not completed whatever host processing is necessary to recognize that adapter 10 has read additional transmit data from the transmit data buffers. For example, the host processor may have to deliver status information or may have to load new transmit data in empty transmit data buffers in host memory 13.

In a preferred embodiment, host processor 15 updates the receive producer index after making an empty receive data buffer available for the selected receive descriptor that is pointed to by the receive producer index. Host processor 15 updates the transmit producer index after making a full transmit data buffer available for the selected transmit descriptor that is pointed to by the transmit producer index. In the host system, free data buffers may be allocated and subsequently reallocated among the various descriptors.

Thus, a comparison of the receive consumer index with the receive producer index, and a comparison of the transmit consumer index with the transmit producer index, indicates whether adapter 10 has work to perform. At times when the respective producer and consumer indices do not match, there are empty receive data buffers and/or full transmit data buffers in host memory 13 that have not yet been filled or emptied, respectively, by adapter 10.

The completion and producer indices generated by the host system are not necessarily equal. Making an empty receive or full transmit data buffer available to a descriptor that is pointed to by a corresponding producer index, and recognizing (by, for example, transferring data from a receive data buffer that was previously filled or transferring data to a transmit data buffer that was previously emptied by the adapter) that data has been transferred to a receive data buffer or from a transmit data buffer by the adapter, are functions that can be performed a synchronously by host processor 15.

As embodied herein, the producer and completion indices that are updated by host processor 15 are transferred to adapter 10, and the consumer indices that are updated by DMA engines 38 and 39 are transferred to host system 11, in order to enable the adapter and the host system to determine whether either device has additional work to perform. Generally, adapter 10 first transfers data between packet memory 16 and host memory 13, then updates its consumer indices, then transfers the updated consumer indices to host memory 13 using DMA engines 38 and 39, and then issues an interrupt if necessary. Typically, host system 11 first executes a driver program that transfers data between the data buffers in host memory 13 and an applications program, then updates its completion indices, then allocates data buffers to descriptors in its queues, then updates its producer indices, and then performs a single CSR (control and status register) write transaction in order to transfer the updated completion and producer indices to adapter 10.

Preferably, host system 11 includes its updated receive and transmit completion indices and its updated receive and transmit producer indices in a single longword that is transferred to adapter 10. As embodied herein, each of the queues contains 256 entries, which requires that each index consist of an eight-bit byte. As a result, all four of the indices that are updated by host system 11 can be transferred to adapter 10 in a single four byte longword. By simultaneously transferring all four of these indices in a single longword, the number of separate transactions and I/O operations that must be initiated by host system 11 during normal operation is kept to a minimum (i.e. a single CSR write).

Figure 3:
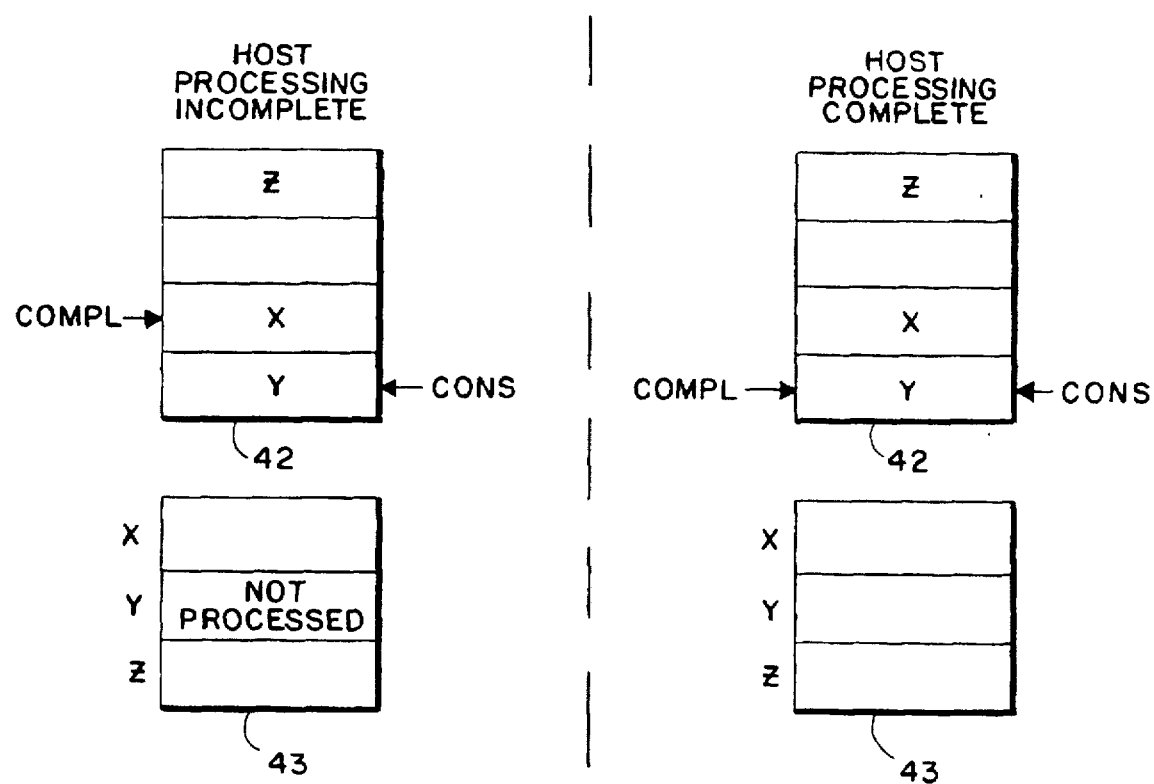
FIG. 3 is a diagram of data structures in a host memory for implementing a completion index in association with a circular queue of data descriptors.

An example of the data structures in host memory 13 for implementing completion indices in association with circular queues of data descriptors is shown in FIG. 3. A receive descriptor queue 42 (having only four entries) is stored in a descriptor block in host memory 13. A set of receive data buffers 43 corresponding to receive descriptor queue 42 is stored in a data block in host memory 13. Although only receive descriptor queue 42 and receive data buffers 43 are shown in FIG. 3, similar data structures are provided in host memory for implementing a completion index in association with a circular queue of transmit data descriptors.

As embodied in FIG. 3, a receive completion index COMPL points to the location in receive descriptor queue 42 corresponding to the last one of receive data buffers 43 in host memory 13 from which receive data written by the adapter has been processed (hatched in FIG. 3) by host processor 15. Receive completion index COMPL is stored in host memory 13. A receive consumer index CONS points to the last location in receive descriptor queue 42 from which a receive descriptor was read by the adapter.

As shown in FIG. 3, receive completion index COMPL is incremented (using modulo arithmetic) whenever receive data written in a receive data buffer corresponding to the next receive descriptor in receive descriptor queue 42 is processed, i.e., read out and provided to an applications program, by host processor 15. When the next receive descriptor is read from receive descriptor queue 42 by adapter 10, receive consumer index CONS is incremented, indicating that adapter 10 is writing additional receive data into the receive data buffer corresponding to that receive descriptor.

As embodied in FIG. 3, receive data that has not yet been processed by host processor 15 is available in receive data buffers 43 whenever the receive consumer index CONS and the receive completion index COMPL do not point to the same location in receive descriptor queue 42. At times when the receive consumer index CONS and the receive completion index COMPL point to the same location in the circular queue, the host processor has completed its processing in response to a transfer of data between host memory 13 and adapter 10.

As shown in FIG. 3, each receive descriptor in queue 42 includes data identifying the starting address of a corresponding receive data buffer in host memory 13. For the example in which host processing is incomplete, receive data stored in a receive data buffer at starting address y of host memory 13 is available (unhatched in FIG. 3) for processing by the host processor.

Figure 4:
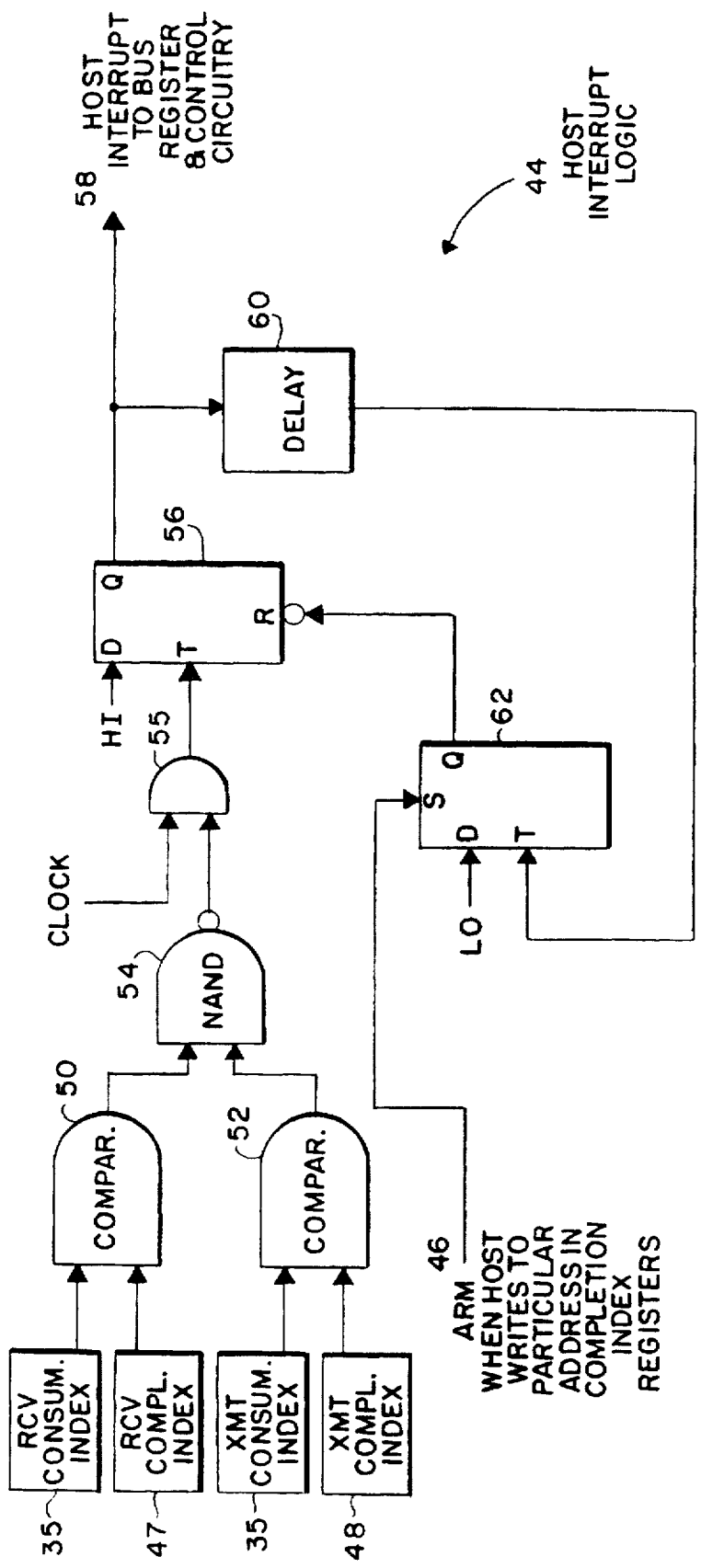
FIG. 4 s a schematic diagram of a preferred embodiment of logic for generating an interrupt.

A schematic diagram of a preferred implementation of host interrupt logic 44 in gate array 30 for generating an interrupt is shown in FIG. 4. As embodied herein, the receive completion index means and transmit completion index means are provided by completion index registers 46 in the packet memory DMA controller gate array (FIG. 1), i.e., receive completion index register 47 and transmit completion index register 48 in FIG. 4. Host system 11 writes the receive and transmit completion indices into registers 47 and 48 after the updating by the host system of internal copies of these indices stored in host memory 13.

As discussed previously, after adapter 10 completes the transfer of one or more packets of data between packet memory 16 and host memory 13, its consumer indices are updated by writing into consumer index registers 35 index values corresponding to the descriptors of the last data buffers in host memory 13 that were written into or read by adapter 10. As embodied herein, the means for comparing the receive completion index with the updated receive consumer index, to determine whether any full receive buffers are available in the host memory for reading of receive data by the host processor from the host memory, and the means for comparing the transmit completion index with the updated transmit consumer index, to determine whether the host processor has completed processing in response to a transfer of transmit data to the packet memory from the host memory, are contained in host interrupt logic 44 shown in FIG. 4.

The host interrupt logic includes a receive comparator 50 for determining whether the updated receive consumer index matches the receive completion index stored in register 47. Similarly, a transmit comparator 52 is included for determining whether the updated transmit consumer index matches the transmit completion index stored in register 48. The outputs of these comparators are provided to a NAND gate 54, and then to a direct flip-flop 56.

In a preferred implementation, means for interrupting the host system, after the transferring of data between the packet memory and the host memory, at times when full receive buffers are available in the host memory for transfers of receive data by the host processor from the host memory, and at times when the host processor has not completed processing in response to the transfer of transmit data to the packet memory from the host memory, is provided by host interrupt logic 44 and bus registers and control circuitry 58. The output of direct flip-flop 56, which stores an indication that determines whether adapter 10 issues an interrupt to the host system, is provided to a host interrupt register in bus registers and control circuitry 58. As embodied herein, an interrupt of host system 11 is initially issued by adapter 10 at times when the updated consumer indices stored in consumer index registers 35 of adapter 10 do not match the completion indices stored in host memory 13 that are received by the adapter from host system 11 and stored in receive and transmit completion index registers 47 and 48.

However, the output of direct flip-flop 56 also is provided to a delay circuit 60, which is input to a delay flip-flop 62. Delay circuit 60 and delay flip-flop 62 provide means for clearing an interrupt arm bit, in response to the interrupting of the host system, to prevent additional interrupts of the host system. When the output of delay flip-flop 62 is low, this output is used to reset ("clear") the output of direct flip-flop 56. As a result, after issuing an interrupt, the adapter is not be able to issue another interrupt even if a mismatch exists between the corresponding consumer and completion indices. A further interrupt may be issued only if the interrupt arm bit is set again, i.e., "rearmed."

As described previously,of the single byte indices four of the single byte indices that are updated by host system 11 to be transferred to adapter 10 in a single four byte longword, thereby reducing the number of separate transactions and I/O operations that must be initiated by host system 11 to a single CSR write. Unfortunately, the receive producer index, the transmit producer index, the receive completion index, and the transmit completion index completely fill one longword when the queues that are utilized contain 256 entries. Therefore, there is no room in the same longword for a rearm request by the host system.

However, it is possible for host system 11 to simultaneously supply a rearm request and each of these four indices to adapter 10, while only using a single transaction to transfer a single longword. In a preferred embodiment of the invention, this is accomplished by providing two separate longword addresses for receiving a single longword from the host system containing the receive producer index, the transmit producer index, the receive completion index, and the transmit completion index. In this preferred embodiment, host system 11 sends a rearm request to the adapter by writing to the first longword address. In response to the receiving of the rearm request from the host system, an interrupt arm bit will be set in host interrupt logic 44. In contrast, if the updated indices are written by the host system to the second longword address, the interrupt arm bit will not be set.

Alternatively, host system 11 can send data to adapter 10 that contains a rearm request from the host system.

Under certain circumstances, the host system may choose not to send a rearm request to the adapter. For example, in real-time data processing systems, host processor 15 can service interrupts for only a limited period of time. If host processor 15 cannot complete all of the required work in servicing an interrupt issued by the adapter, the corresponding completion and consumer indices will not match. Therefore, the host processor will not send a rearm request to the adapter in order to prevent the adapter from immediately issuing another interrupt to the host system.

In a preferred embodiment of the invention, means for receiving a rearm request from the host system, and means for setting the interrupt arm bit in response to the receiving of a rearm request from the host system, is provided by delay flip-flop 62.

When host system 11 writes to the first longword address, a signal is provided at the set input terminal of delay flip-flop 62, causing the output of delay flip-flop 62 to be high. As a result, the delay flip-flop will no longer supply a reset (low) signal to the reset input terminal of direct flip-flop 56. Therefore, the direct flip-flop will be able to provide a high output to indicate that adapter 10 should send another interrupt to the host system, at times when the receive or transmit completion index is different from the updated receive or transmit consumer index. Accordingly, a high output from the delay flip-flop corresponds to the setting of an interrupt arm bit.

In another embodiment of the invention, separate interrupts may be issued for receive data and for transmit data. In such an embodiment, logic of the type shown in FIG. 4 is provided that enables both a receive interrupt arm bit and a transmit interrupt arm bit to be independently set and rearmed.

It will be apparent to those skilled in the art that various modifications and variations can be made in the present invention without departing from the scope or spirit of the invention. For example, various implementations of hardware and/or software can be used to transfer data via DMA and to set and reset an interrupt mechanism, and communication can be performed over different types of system or I/O buses and networks. Thus, it is intended that the present invention cover the modifications and variations or this invention provided they come within the scope of the appended claims and their equivalents.

What is claimed is:

1. A method of controlling interrupts by an adapter to a host system, said host system having a host memory, said host memory having buffers, and further said host system having a driver to operate said adapter, the method comprising the steps of:

consuming buffers in said host memory by said adapter using said driver in reading said buffers during adapter read operation, and in writing said buffers during adapter write operation;

maintaining a consumer index in said adapter, said consumer index indicating a last buffer consumed, as consumed buffers are indicated by said adapter, said adapter updating said consumer index to a current value as new buffers are consumed;

writing a completion index to said adapter by said driver after all buffers are consumed, said completion index indicating a last buffer consumed, as consumed buffers are indicated by said host system;

setting an arm bit in said adapter, said arm bit indicating that said driver in said host system has completed servicing of an interrupt issued by said adapter; and, interrupting said host system by said adapter to activate said driver, in the event that said arm bit is set AND said completion index indicates a different buffer than said current value of said consumer index.

2. A method for controlling interrupts by an adapter to a host system, said adapter writing data to buffers in a host memory in said host system, said adapter and said host memory connected by a system bus, the method comprising the steps of:

maintaining a receive consumer index by said adapter, said receive consumer index indicating a last buffer in said host memory where said adapter has written data, as consumed buffers are indicated by said adapter;

writing data by said adapter into a buffer indicated by said receive consumer index, said adapter updating said receive consumer index to a current value as said data is written into new buffers;

writing a completion index by a driver to said adapter, said completion index indicating a last consumed buffer, as consumed buffers are indicated by said driver in said host system;

setting an arm bit in said adapter to indicate that said driver in said host system has completed servicing of an interrupt issued by said adapter; and, interrupting said host by said adapter to activate said driver, in the event that said arm bit is set AND said completion index indicates a different buffer than said current value of said receive consumer index.

3. A method for controlling interrupts by an adapter to a host system, said adapter reading data from buffers in a host memory in said host system, said adapter and said host memory connected by a system bus, the method comprising the steps of:

maintaining a transmit consumer index by said adapter, said transmit consumer index indicating a last buffer in said host memory where said adapter has read data, as said buffers are indicated by said adapter;

reading data by said adapter from a buffer indicated by said transmit consumer index, said adapter updating said transmit consumer index to a current value as new buffers are read;

writing a completion index by a driver to said adapter after all buffers are read, said completion index indicating a last buffer read as said buffers are indicated by said driver in said host system;

setting an arm bit in said adapter to indicate that said driver in said host system has completed servicing of an interrupt issued by said adapter; and, interrupting said host system by said adapter to activate said driver, in the event that said arm bit is set AND said completion index indicates a different buffer than said current value of said transmit consumer index.

4. The method of claim 1, or claim 2, or claim 3 further comprising:

testing periodically under the control of a clock, whether said arm bit is set in conjunction with testing the equality of said completion index and said current value of said consumer index.

5. The method of claim 1, or claim 2, or claim 3 further comprising:

writing a consumer index by said adapter to said host.

6. The method of claim 1, or claim 2, or claim 3 wherein said setting of an arm bit in said adapter, further comprises:

detecting, by said adapter, the write of said completion index to said adapter, and setting said arm bit in response to detection of writing said completion index to said adapter.

7. The method of claim 1, or claim 2, or claim 3 wherein said setting of an arm bit in said adapter, further comprises:

writing said arm bit to said adapter by said host.

8. The method as in claim 1, or claim 2, or claim 3, further comprising:

transferring, in response to said interrupting said host, data between a packet memory in said adapter and said host memory by said consuming buffers in said host memory.

9. The method as in claim 8 in which the step of transferring data between said packet memory and said host memory comprises:

transferring data via DMA.

10. The method in accordance with claim 1, or claim 2, or claim 3, further comprising:

clearing said arm bit, in response to said interrupting of said host system, to prevent additional interrupts of said host system.

11. The method in accordance with claim 1, or claim 2, or claim 3, further comprising:

receiving a rearm request from said host system; and, setting said arm bit in response to said receiving of a rearm request.

12. The method in accordance with claim 1, or claim 2, or claim 3, further comprising:

transferring, in response to said current value of said consumer index, an updated consumer index to said host system after a transferring of data between a packet memory and said host memory.

13. The method in accordance with claim 1, or claim 2, or claim 3, wherein said host system has a network coupled to said host system, further comprising:

transferring data between a packet memory and said network.

14. An apparatus to control interrupts by an adapter to a host system, said host system having a host memory, said host memory having buffers, and further said host system having a driver to operate said adapter, the apparatus comprising:

means for consuming buffers in said host memory by said adapter using said driver in reading said buffers during adapter read operation, and in writing said buffers during adapter write operation;

means for maintaining a consumer index in said adapter, said consumer index indicating a last buffer consumed, as consumed buffers are indicated by said adapter, said adapter updating said consumer index to a current value as new buffers are consumed;

means for writing a completion index to said adapter by said driver after all buffers are consumed, said completion index indicating a last buffer consumed, as consumed buffers are indicated by said host system;

means for setting an arm bit in said adapter, said arm bit indicating that said driver in said host system has completed servicing of an interrupt issued by said adapter; and, means for interrupting said host system by said adapter to activate said driver, in the event that said arm bit is set AND said completion index indicates a different buffer than said current value of said consumer index.

15. An apparatus to control interrupts by an adapter to a host system, said adapter writing data to buffers in a host memory in said host system, said adapter and said host memory connected by a system bus, the apparatus comprising:

means for maintaining a receive consumer index by said adapter, said receive consumer index indicating a last buffer in said host memory where said adapter has written data, as consumed buffers are indicated by said adapter;

means for writing data by said adapter into a buffer indicated by said receive consumer index, said adapter updating said receive consumer index to a current value as said data is written into new buffers;

means for writing a completion index by a driver to said adapter, said completion index indicating a last consumed buffer, as consumed buffers are indicated by said driver in said host system;

means for setting an arm bit in said adapter to indicate that said driver in said host system has completed servicing of an interrupt issued by said adapter; and, means for interrupting said host by said adapter to activate said driver, in the event that said arm bit is set AND said completion index indicates a different buffer than said current value of said receive consumer index.

16. An apparatus to control interrupts by an adapter to a host system, said adapter reading data from buffers in a host memory in said host system, said adapter and said host memory connected by a system bus, the apparatus comprising:

means for maintaining a transmit consumer index by said adapter, said transmit consumer index indicating a last buffer in said host memory where said adapter has read data, as said buffers are indicated by said adapter;

means for reading data by said adapter from a buffer indicated by said transmit consumer index, said adapter updating said transmit consumer index to a current value as new buffers are read;

means for writing a completion index by a driver to said adapter after all buffers are read, said completion index indicating a last buffer read as said buffers are indicated by said driver in said host system;

means for setting an arm bit in said adapter to indicate that said driver in said host system has completed servicing of an interrupt issued by said adapter; and, means for interrupting said host by said adapter to activate said driver, in the event that said arm bit is set AND said completion index indicates a different buffer than said current value of said transmit consumer index.

17. The apparatus of claim 14 or claim 15 or claim 16, further comprising:

means for testing periodically under the control of a clock, whether said arm bit is set in conjunction with testing the equality of said completion index and said current value of said consumer index.

18. The apparatus of claim 14 or claim 15 or claim 16, further comprising:

means for writing a consumer index by said adapter to said host.

19. The apparatus of claim 14 or claim 15 or claim 16, wherein said means for setting of an arm bit in said adapter, further comprises:

means for detecting, by said adapter, the write of said completion index to said adapter, and setting said arm bit in response to detection of writing said completion index to said adapter.

20. The apparatus of claim 14 or claim 15 or claim 16, wherein said means for setting of an arm bit in said adapter, further comprises:

writing said arm bit to said adapter by said host.

21. The apparatus of claim 14 or claim 15 or claim 16, further comprising:

means for transferring, in response to said interrupting said host, data between a packet memory in said adapter and said host memory by said consuming buffers in said host memory.

22. The apparatus of claim 14 or claim 15 or claim 16, further comprising:

means for clearing said arm bit, in response to said interrupting of said host system, to prevent additional interrupts of said host system.

23. The apparatus of claim 14 or claim 15 or claim 16, further comprising:

means for receiving a rearm request from said host system; and, means for setting said arm bit in response to said receiving of a rearm request.

24. The apparatus in accordance with claim 14 or claim 15 or claim 16, further comprising:

means for transferring, in response to said current value of said consumer index, an updated consumer index to said host system after a transferring of data between a packet memory and said host memory.

25. The apparatus of claim 14 or claim 15 or claim 16, wherein said host system has a network coupled to said host system, further comprising:

means for transferring data between said a packet memory and said network.

* * * * *